May 12, 1959 S. A. CORDERMAN 2,886,655
AMPLIFIER
Filed June 30, 1955
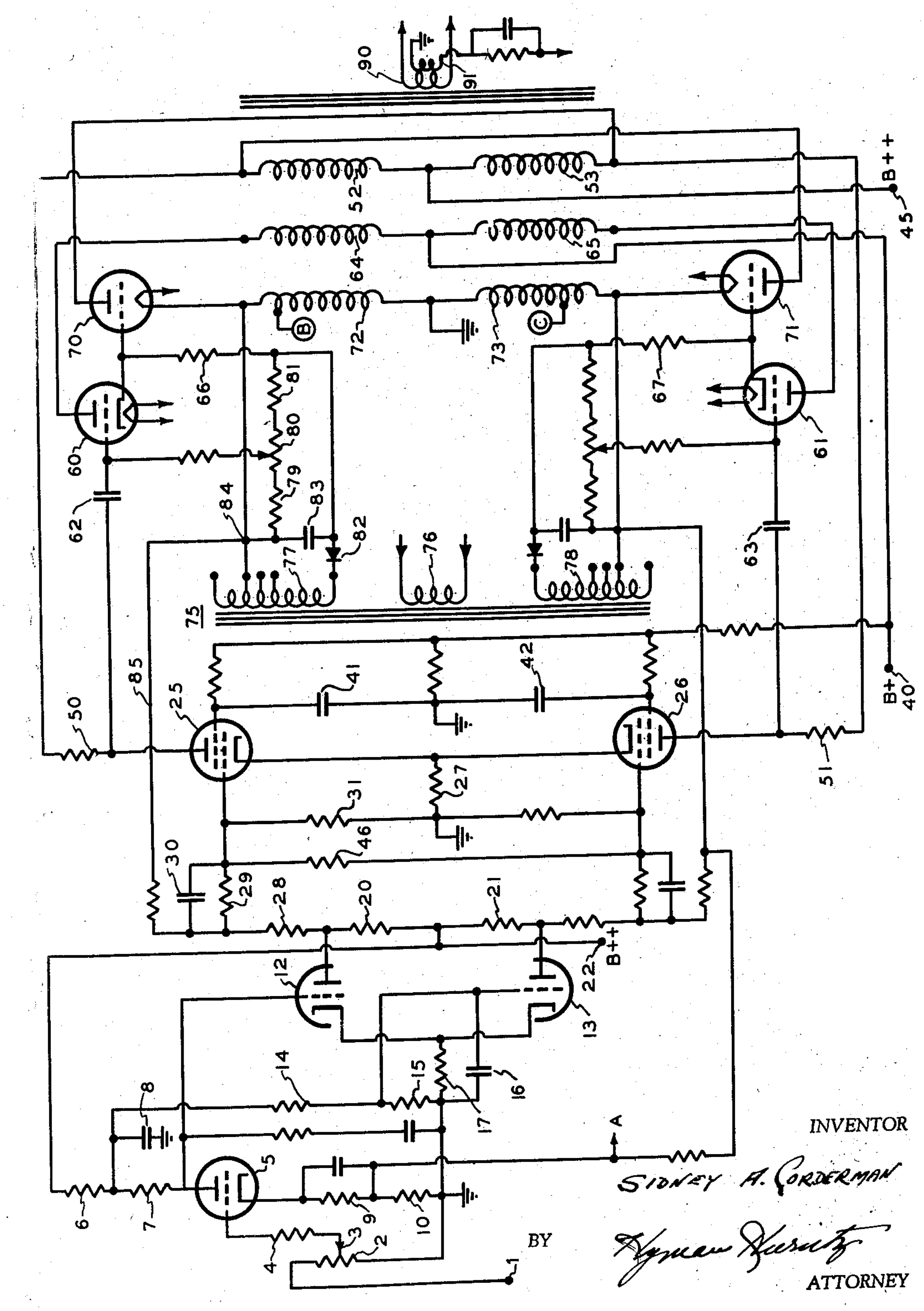
INVENTOR
SIDNEY A. CORDERMAN
BY
Hyman Hurvitz
ATTORNEY United States Patent Office 2,886,655

Patented May 12, 1959

2,886,655

AMPLIFIER

Sidney A. Corderman, Binghamton, N.Y., assignor to McIntosh Laboratory, Inc., Binghamton, N.Y., a corporation of Delaware Application June 30, 1955, Serial No. 519,134

17 Claims. (Cl. 179—171)

The present invention relates generally to high fidelity amplifiers, particularly intended for wide band audio amplification with low distortion, over a wide band of frequencies, at high power and efficiency.

Briefly describing the present invention, an input signal is applied to a single ended amplifier stage, and by that stage to a phase inverter. The latter is coupled to a push-pull voltage amplifier stage via a D.C. step network, which limits low frequency phase shift. The voltage amplifier stage drives a push-pull cathode follower stage, and the latter drives a class B output stage. The latter may be arranged in accordance with the teachings of U.S. Patents No. 2,477,074 and No. 2,646,467, issued to F. McIntosh. In the output circuits of the devices of these patents is employed a bifilar output transformer having two cathode windings, and two anode windings. These cathode windings are bifilarly related to the anode windings, and the connection between the tube electrodes and the windings is such that the cathode of each of the tubes of the output stage is unity coupled to the plate of the other tube. The tubes are thus each half anode loaded and half cathode loaded, and the unity coupling provision assures low distortion for class B operation.

The cathode follower driver stage employs direct coupling to the grids of the output stage, which in one embodiment of my invention is designed to deliver 200 watts of undistorted output. The drive impedance is thus low at the input circuits of the output tubes, which makes possible linear drive of the output tubes into the grid current region. This type of operation is required for effective class B operation.

The output tubes may operate at a voltage far exceeding that which is proper for the cathode follower driver stage. Accordingly, a separate power supply is employed for the latter.

The cathode voltage swings of the output stage far exceed the grid and cathode voltage swings of the cathode loaded driver stage. To compensate, two transformer windings are bifilarly related to the cathode windings of the output stage and are connected respectively in series with the anodes of the cathode follower stage. Thereby the anodes of the cathode follower stage swing in voltage in precise correspondence with the cathodes of the output stage. The grids of the cathode follower driver stage are coupled to the preceding plate loaded voltage amplifier stage, but in series with a floating D.C. bias voltage supply, and the cathode windings of the output stage. Thereby, the grids of the cathode follower driver stage are voltage driven in correspondence with the cathodes, and nevertheless are supplied with a suitable D.C. bias. Superposed on the voltage variations deriving from the output stage, at the cathode follower driver stage, are the voltage variations deriving from the preceding voltage amplifier. The latter is supplied with anode voltage in series with the anode windings of the output stage, so that the anode swings of the voltage amplifier are in part due to input signal and in part due to feed-back from the output stage. The latter feed-back enables a high gain voltage gain to be derived from the voltage amplifier.

Additional negative feed-back loops are provided to reduce noise and distortion within the amplifier, and to make possible a high output damping factor. A first feed-back loop extends from the cathodes of the output tubes to the grids of the voltage amplifier tubes. A further feed-back loop extends from the output transformer primary winding to the cathode of the single ended input stage. If desired, still another negative feed-back loop may be introduced between a transformer secondary winding to the cathode of the single ended input stage, the winding being bifilarly related to the usual output secondary winding, so that the feed-back signal is a precise replica at all frequencies of the signal actually delivered to the load.

It is accordingly, a broad object of the present invention to provide a novel high power, high efficiency high fidelity audio amplifier.

It is another object of the present invention to provide an amplifier having an output stage which is half cathode loaded and half anode loaded, and which is driven by a cathode follower driver stage having electrodes all of which are driven from the output stage in such magnitude and phase as to leave a residual drive substantially due to signal input alone.

It is a further object of the invention to provide an amplifier having a voltage amplifier stage, a cathode follower stage, and a partially cathode loaded output stage connected in cascade, the anode of the cathode follower stage being supplied with an A.C. component of voltage deriving by means of a unity coupled transformer winding from the output transformer, whereby the D.C. anode voltage of the cathode follower stage may be selected independently of the D.C. anode voltage of the output stage, but may accurately follow the A.C. variations of the anodes and cathodes of the latter.

A further object of the invention resides in the provision of a novel floating D.C. bias circuit for an amplifier.

Another object of the present invention is the provision of a novel arrangement of cathode follower driver stage and cathode loaded output stage, wherein both stages are D.C. biased from a common floating rectifier circuit, one terminal of which is connected for D.C. to the cathode of the output stage.

The above and still further features, objects, and advantages of the invention will become apparent upon consideration of the following detailed description of a specific embodiment of the invention, especially when taken in conjunction with the accompanying drawings, wherein the single figure of the drawings is a schematic circuit diagram of a specific embodiment of the invention.

Proceeding now to describe a specific embodiment of the invention, by reference to the accompanying drawings audio input signal is applied to terminal 1, and across volume control potentiometer 2. A variable tap 3 is connected via a small resistance 4 to the control electrode of a single ended amplifier tube 5, to supply input signal thereto.

The circuit of amplifier tube 5 includes two series anode resistances, 6 and 7, the latter of which is by-passed to ground for A.C. signals by condenser 8. Resistance 6 (100K) then acts as an A.C. load, and resistance 7 as a D.C. dropping resistance only.

In the cathode resistance of tube 5 are connected in series two resistances, 9 and 10. Resistance 9 is by-passed by condenser 11, and therefore acts only to establish bias for tube 5. Resistance 10 (68 ohms) is un-by-passed and serves as a feed-back resistance.

The tube 5 drives a phase inverter comprising triodes 12, 13. The anode of tube 5 is directly connected to the grid of tube 12. Between ground and the junction of resistance 6, 7 is connected a voltage divider, comprising resistances 14, 15. The junction point of resistances 14, 15 is connected to the grid of triode 13, and serves to establish a bias, since these resistances are by-passed to ground by condenser 8. The grid of triode 13 is at ground potential for A.C. signals, by virtue of condenser 8, and the triode 13 is cathode driven, by un-bypassed cathode resistance 17. Triodes 12, 13, which are respectively grid and cathode driven, accordingly provide phase inversion, in a manner well known per se.

The anodes of triodes 12, 13 include load resistances 21, 21, respectively, and are supplied from anode voltage supply terminal 22, as is also the tube 5.

The phase inverter comprising triodes 12, 13 drives a push-pull anode loaded voltage amplifier, comprising tetrodes 25, 26. The cathodes of the tetrodes 25, 26 are commonly connected to ground via a resistance 27, which is un-bypassed, and accordingly provides both bias and feed-back.

The control grids of tetrodes 25, 26 are directly driven from the anodes of triodes 12, 13, via voltage dividers. Describing one of the latter only, two resistances 28, 29 (10K, IM) are connected in series between the anode of triode 12 and the grid of tetrode 25. Resistance 29 is by-passed for audio signals by a capacitor 30. The control grid of tetrode 25 is connected to ground via resistance 31 (100K).

The tetrodes 25, 26 are provided with screen voltage in conventional fashion, from a terminal 40, condensers 41, 42 being the usual screen filter condensers. The terminal 40 is a relatively low voltage terminal, say 300 v. The anodes of tetrodes 25, 26 on the other band, are connected with terminal 22, which is at a higher voltage, say 900 v. The resistance 29 is a high resistance, about one megohm, and the resistance 31, a relatively low, say 100K, whereby the D.C. voltage at the control grids may be reduced to a suitably low value, say about 20 v. The anodes of tetrodes 25, 26 are supplied with D.C. from terminal 45, which may be at 900 v. This high voltage provides a drop in the cathode resistor 27, say 50 v. so that the tetrodes 25, 26 are biased negatively, while directly coupled. The resistance 29 is shunted by a by-pass condenser 30, to provide a low resistance path for A.C. signal, while establishing a high D.C. drop.

A resistance 46 (about 100M) is connected directly across the grids of tetrodes 25, 26 to equalize the bias voltages of the tetrodes, and control the low frequency response of the grid coupling circuits.

The tetrodes 25, 26 are resistance loaded in their anode circuits by resistances 50, 51, which are in series with the anode voltage from terminal 45, via windings 52, 53. The purpose of the latter windings will be described hereinafter.

The tetrode voltage amplifier tubes 25, 26 drive a push-pull pair of cathode follower tubes 60, 61 via coupling capacitors 62, 63. Accordingly, the grids of triodes 60, 61 are D.C. isolated from the anodes of tetrodes 25, 26. The anodes of triodes 60, 61 are supplied with voltage from terminal 40, i.e. at relatively low voltage, and via windings 64, 65, respectively.

The triodes 60, 61 are cathode follower tubes, having cathode resistances 66, 67, from which are derived A.C. voltage for driving output triodes 70, 71. The latter are half anode loaded and half cathode loaded. The anode loads for triodes 70, 71 supplied by windings 53, 52 respectively, and D.C. supply for triodes 70, 71 are respectively loaded by windings 72, 73. The windings 52, 54, 72 are trifilarly wound, as are also the windings 53, 65, 73. It follows that adjacent terminals of the several sets of windings are always at the same A.C. voltage, for frequencies from as low as a fractional cycle, to frequencies far above the audio band. The cathode of triode 70, accordingly, remains at the same A.C. voltage as the anode of triode 71, and the cathode of triode 71 at the same A.C. potential as the anode of triode 70. Similarly, the D.C. anode supply for tetrodes 25, 26 has superposed thereon voltage variations at audio frequency which are exactly the same as those which occur at the cathodes of triodes 70, 71.

A bias power transformer 75 is provided, having a primary or input winding 76, and two secondary windings 77, 78. Taking the bias circuit supplied by secondary winding 78 as typical, the winding 77 is connected in series with resistances 79, 80, 81, and a dry rectifier 82. The winding 77 and the rectifier 82, in series, are shunted by a filter condenser 83. The bias circuit is not directly connected to any point of fixed A.C. potential, but floats. The rectifier 82 is so poled that the direction of falling voltage is that from resistance 79 toward resistance 87, i.e. the positive terminal 84 of the bias circuit is connected to the cathode of triode 70. The bias circuit accordingly provides a negative bias, which serves to overcome the opposing D.C. drop through cathode resistance 66, and serves to establish a negative bias of about 50 v. at the grid of triode 70. Since the A.C. swing at the grid of triode 70 is about ±150 v. the triode 70 is operated well into its grid current region. Such operation is desirable for class B operation, and is permitted because of the cathode follower drive, which enables use of a low impedance input circuit for triode 70.

The fact that the bias circuit is directly connected to the cathode of triode 70, at terminal 70, implies that the entire bias circuit swings with the voltage of the cathode of triode 70, and of the anode of tetrode 25, during amplification of A.C. signals. The cathode of the cathode follower tube 60, and its grid, being connected for D.C. to the bias circuit, swing similarly. The anode of the triode 60 is identically swung by the windings 64.

It follows that cathode, grid and anode of triode 60 follow precisely the A.C. voltage excursions of the cathode of triode 70, while driving the latter, and that the bias circuit not only assures this action but also establishes the D.C. bias differences which are requisite to the operation of the output stage and its driver.

The terminal 84 is at D.C. ground potential. This D.C. potential, as well as the voltage swings of the cathode of triode 70, are transferred to the lead 85, which connects with the junction of resistances 28, 29. The A.C. component of voltage in lead 85 is applied directly to the grid of tetrode 25, so that both the grid and the anode of the latter swing similarly in A.C. voltage. The resistance 29 serves for D.C. isolation of the grid circuit of tetrode 25. The load resistance 50 serves to reduce the feed-back at the anode of tetrode 25 relative to that at the grid. Accordingly, an effective negative feed-back loop is established from the cathode of triode 70 to the grid of tetrode 25, which may be of the order of 9 db.

The cathode of triode 71 is also connected to the junction of resistances 9, 10, in the cathode circuit of triode 5, establishing a further feed-back loop, which provides a feed back of about 20 db around the entire system.

The tube types employed in one specific embodiment of my invention are:

| Reference numeral: | Tube type |
|---|---|
| 5 | 12AX7 |
| 12, 13 | 12AU7 |
| 25, 26 | 6AU5 |
| 60, 61 | 6BX7 |
| 70, 71 | 8005 |

While I have described my invention as applicable to a circuit employing specific voltages, tube types and component values, pursuant to the applicable statutes, it will be clear to those skilled in the art that variations of values, and B tube types may be resorted to, and that rearrangement of arcuity and circuit details may be resorted to.

without departing from the true spirit and teaching of the invention, as defined in the appended claims.

If desired, the low impedance output winding 90 of the output transformer may have associated therewith a bifilarly related feed-back winding 91, which may supply feed back signal across resistance 10, thereby providing an additional overall feed-back loop, which moreover provides an exact replica of the output signal as it appears in the output winding.

While I have described and illustrated one specific example of the present invention it will be clear that variations of the specific details of construction may be resorted to without departing from the true spirit of the invention as defined in the appended claims.

What I claim is:

1. In combination, a cathode loaded amplifier tube having an anode, a cathode and a control grid, a load connected between said cathode and a point of fixed reference potential, a transformer having a primary winding and a secondary winding, a rectifier, a bias resistance, means connecting said secondary winding in series with said bias resistance and said rectifier, means connecting said cathode to one point of said bias resistance, means connecting said control grid to a further point of said bias resistance, said points being selected to provide bias for said control grid, a cathode follower driver stage having a control grid and a cathode, a cathode resistance, said cathode resistance being connected between the cathode of said cathode follower driver and a point of said bias resistance, a direct connection between the cathode of said cathode follower driver and said first mentioned control grid, and a D.C. connection between the control grid of said cathode follower driver and a point of said bias resistance.

2. In an amplifier, an output stage including a first pair of push-pull connected output vacuum tubes, a cathode load for each of said vacuum tubes, an anode load for each of said vacuum tubes, means unity coupling the anode load of each of said vacuum tubes to the cathode load of the other of said vacuum tubes, a push-pull cathode follower driver stage for said output stage, said driver stage including a third vacuum tube having an anode and a fourth vacuum tube having an anode, and means for unity coupling said anodes to said cathode loads and said anode loads.

3. The combination in accordance with claim 2 wherein each of said loads is a transformer winding, and wherein the last mentioned means for unity coupling is electromagnetic coupling and includes windings bifilarly related to said transformer windings.

4. In an amplifier, a first vacuum tube having a first control electrode, anode and cathode, a second vacuum tube having a second control electrode, anode, and cathode, a terminal of fixed reference potential, a first transformer winding connected between said first cathode and said terminal, a second transformer winding connected between said second cathode and said terminal, a first source of anode voltage, a third winding unity coupled to said first winding and connected in series between said first source of anode voltage and said second anode, a fourth winding unity coupled to said second winding and connected in series between said first source of anode voltage and said first anode, a driver stage including a third vacuum tube having a third anode, cathode and control electrode, and a fourth vacuum tube having a fourth anode, cathode, and control electrode, a first resistive load for said third anode, a second resistive load for said fourth anode, a D.C. connection in series between said source and said third and fourth anodes via said third and fourth windings, respectively, and said first and second resistive loads respectively, a D.C. connection between said first and second cathodes and said third and fourth control electrodes, respectively and means for driving said first and second vacuum tubes in response to signal applied in balanced relation to said third and fourth control electrodes.

5. The combination in accordance with claim 4 wherein said last means includes a push-pull cathode follower stage.

6. The combination in accordance with claim 5 wherein said cathode follower stage includes a fifth vacuum tube and a sixth vacuum tube, said fifth and sixth vacuum tube connected in balanced input and output circuit relation.

7. The combination in accordance with claim 6 wherein said fifth and sixth vacuum tubes include fifth and sixth anodes, cathodes and control electrodes, respectively, a first D.C. connection between said fifth cathode and said first control electrode, a second D.C. connection between said sixth cathode and said second control electrode, a third D.C. connection between said fifth control electrode and said first control electrode, a fourth D.C. connection between said sixth control electrode and said first control electrode, a further source of anode voltage of lower voltage than said first mentioned source of anode voltage, means for connecting said fifth and sixth anodes to said further source of anode voltage, and means comprising fifth and sixth windings bifilarly related to said first and second windings connected in series respectively between said further source of anode voltage and said fifth and sixth anodes.

8. The combination in accordance with claim 7 wherein is further provided a first and second transformer secondary winding, a first and second rectifier, a first and second bias resistance, means connecting each of said transformers, secondary windings, rectifiers, and bias resistances in a separate closed series circuit, means connecting a point of said first bias resistance directly to said first cathode, means connecting a point of said second bias resistance directly to said second cathode, means for connecting said first, third, and fifth control electrodes to respectively different points of said first bias resistance, and means for connecting said second, fourth, and sixth control electrodes to different points of said second bias resistance.

9. An amplifier including a first class B amplifier stage including a vacuum tube having a first anode, cathode and grid, a second class B amplifier stage including a second vacuum tube having a second anode, cathode and grid, a first transformer winding in the cathode circuit of said first vacuum tube, a second transformer winding in the cathode circuit of said second vacuum tube, a third amplifier stage including a third vacuum tube having a third anode, cathode and grid, a fourth amplifier stage including a fourth vacuum tube having a fourth anode, cathode and grid, means connecting said third and fourth stages as balanced cathode follower driver stages for said first and second stages, a D.C. connection between said first grid and said third cathode, a D.C. connection between said second grid and said fourth cathode, a D.C. connection between said first grid and said third grid, a D.C. connection between said second grid and said fourth grid, and means including a transformer secondary winding, a rectifier, and a voltage dropping resistance for establishing a fixed D.C. voltage difference between said first grid and said third grid and between said second grid and said fourth grid.

10. A high power amplifier comprising, an output stage including a vacuum tube amplifier including a cathode, anode and control grid and having an anode load and a cathode load, said anode and cathode loads being each an inductive load, a high voltage source of B+ voltage for said vacuum tube amplifier, a driver stage for said output stage, said driver stage including a vacuum tube having an anode, cathode and control grid, a cathode load for said driver stage vacuum tube, a direct connection between the cathode of said driver stage and the control grid of the output stage vacuum tube, an inductive element unity A.C. coupled with the cathode load of said output stage vacuum tube, a low voltage source of B+ voltage for said driver stage, means connecting said inductive element in series between said low voltage source of B+ voltage and the anode of said driver stage tube, a single floating bias voltage source for said output stage grid and said driver stage grid, said single floating bias voltage source including means for maintaining a predetermined D.C. voltage difference between said grids during A.C. drive of said grids.

11. In an amplifier for amplifying an A.C. signal, an output stage having a first vacuum amplifier tube, including a first anode, cathode and control grid, a driver stage having a second vacuum amplifier tube including a second anode, cathode and control grid, means for maintaining identity of A.C. voltage between the first cathode and the second anode, a resistive load in series with the second cathode, a direct connection between the second cathode and the first grid, and means for maintaining a fixed D.C. voltage difference between said first and second grids, said last means including a single voltage dividing resistance and connections between each of said grids and said resistance.

12. In an amplifier, a first stage, a second stage and a third stage, means connecting said stages in cascade, said first stage including an amplifier tube having a first anode, said second stage including an amplifier tube having a second anode, cathode and grid, said third stage including an amplifier tube having a third anode, cathode and grid, a cathode load for said third cathode, means unity coupling said third cathode and said second anode for A.C. only, means for applying A.C. variations of voltage of said third cathode to said first anode, a direct connection between said second cathode and said third grid, and an A.C. coupling between said first anode and said second grid.

13. The combination in accordance with claim 12, wherein is provided means comprising a floating bias voltage source for maintaining a fixed D.C. voltage difference between said second and third grids, and means for imparting to each of said second and third grids the A.C. voltage excursions of said third cathode.

14. An amplifier for A.C. signals including a first vacuum tube having a first anode, cathode and grid, a second vacuum tube having a second anode, cathode and grid, a cathode load for said second cathode, a D.C. connection between said first cathode and said second grid, means for imparting voltage excursions of said second cathode to said first anode, a resistance, means for developing a D.C. bias voltage across said resistance, means for connecting said first and second grids to points of said resistance, means for connecting said second cathode to a point of said resistance, and means for applying A.C. driving signals to said first grid.

15. An amplifier including a first stage, and a following stage, said first stage including a first vacuum amplifier tube having a first anode, cathode and control grid, said second stage including a second vacuum amplifier tube including a second anode, cathode and control grid, a first source of anode voltage for said first tube, a second source of anode voltage for said second tube, a cathode bias resistance in series between said second cathode and a point of reference potential, a load resistance in series between said first anode and said first source of anode voltage, a D.C. voltage divider between said first source of anode voltage and said point of reference potential, said D.C. voltage divider including said load resistance, a connection between said second grid and a point of said voltage divider, the D.C. voltage of said point and the value of said bias resistance arranged and adapted to provide a predetermined total bias voltage between said first anode and said second cathode.

16. An amplifier for a band of frequencies including a vacuum amplifier tube having a cathode, an anode and a control grid, a load resistance in series with said anode, a transformer secondary winding in series with said load resistance, a source of said band of signals, means for coupling said source to said control grid, a transformer primary winding, means for developing across said transformer primary winding an amplified replica of said band of signals, said primary and secondary windings being substantially unity coupled, and means for applying said amplified replica of said band of frequencies to said control grid in phase with the voltage applied to said anode by said secondary winding.

17. In a cascade amplifier having two stages in cascade, wherein each of the stages includes a vacuum amplifier tube of the type having an anode, a cathode and a control grid, means for maintaining substantial identity of A.C. potential of the grid of the second stage and the cathode of the first stage, means for maintaining substantial identity of the A.C. potential of the cathode of the second stage and the anode of the first stage, and means for maintaining substantial identity of A.C. potential of the control grids of said stages.

References Cited in the file of this patent

UNITED STATES PATENTS

| | | |
|---|---|---|
| 2,523,240 | Vackar | Sept. 19, 1950 |
| 2,543,819 | Williams | Mar. 6, 1951 |
| 2,646,467 | McIntosh | July 21, 1953 |
| 2,648,727 | Rockwell | Aug. 11, 1953 |
| 2,761,021 | Leuthold | Aug. 28, 1956 |
| 2,764,641 | Muschamp | Sept. 25, 1956 |

FOREIGN PATENTS

| | | |
|---|---|---|
| 892,851 | France | Jan. 17, 1944 |